(12) United States Patent
Okada et al.

(10) Patent No.: US 7,723,693 B2
(45) Date of Patent: May 25, 2010

(54) RADIATION DETECTING APPARATUS AND RADIATION IMAGING SYSTEM USING THE SAME

(75) Inventors: Satoshi Okada, Kanagawa-ken (JP); Yoshihiro Ogawa, Tokyo (JP); Masato Inoue, Saitama-ken (JP); Shinichi Takeda, Saitama-ken (JP); Kazumi Nagano, Kanagawa-ken (JP); Keiichi Nomura, Saitama-ken (JP); Satoru Sawada, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 11/633,448

(22) Filed: Dec. 5, 2006

(65) Prior Publication Data

US 2007/0131867 A1   Jun. 14, 2007

(30) Foreign Application Priority Data

Dec. 8, 2005   (JP)   ............................. 2005-354888

(51) Int. Cl.
   *G01T 1/24* (2006.01)
(52) U.S. Cl. .................................. 250/370.01; 250/588
(58) Field of Classification Search ................. 250/300, 250/370.01, 588
   See application file for complete search history.

(56) References Cited

U.S. PATENT DOCUMENTS

| 6,635,893 | B2 * | 10/2003 | O'Kane et al. ............ 250/506.1 |
| 6,965,111 | B2 | 11/2005 | Endo ..................... 250/370.11 |
| 7,205,547 | B2 | 4/2007 | Ishii et al. .............. 250/370.09 |
| 7,205,568 | B2 | 4/2007 | Watanabe et al. ............. 257/59 |
| 7,256,404 | B2 | 8/2007 | Inoue et al. ............. 250/370.11 |
| 2005/0151087 | A1 * | 7/2005 | Ueno et al. ............. 250/370.09 |
| 2005/0230629 | A1 | 10/2005 | Watanabe et al. ....... 250/370.01 |
| 2006/0024638 | A1 * | 2/2006 | Rosenblood et al. ........... 433/29 |
| 2006/0033031 | A1 | 2/2006 | Takeda et al. ........... 250/370.11 |
| 2006/0033040 | A1 | 2/2006 | Okada et al. ............. 250/484.2 |
| 2006/0062352 | A1 | 3/2006 | Nomura et al. ............. 378/98.8 |
| 2006/0065944 | A1 | 3/2006 | Mochizuki et al. ........... 257/444 |
| 2006/0249763 | A1 | 11/2006 | Mochizuki et al. ........... 257/291 |
| 2007/0045556 | A1 | 3/2007 | Watanabe et al. ....... 250/370.14 |
| 2007/0051896 | A1 | 3/2007 | Okada et al. ........... 250/370.11 |
| 2007/0069107 | A1 | 3/2007 | Ishii et al. ................. 250/208.1 |
| 2007/0131867 | A1 | 6/2007 | Okada et al. ........... 250/370.09 |
| 2007/0145285 | A1 | 6/2007 | Ishii et al. .............. 250/370.11 |
| 2007/0146520 | A1 | 6/2007 | Watanabe et al. ............ 348/308 |
| 2007/0205371 | A1 | 9/2007 | Inoue ..................... 250/370.11 |

FOREIGN PATENT DOCUMENTS

| JP | 2002-40144 | 2/2002 |
| JP | 2004-33659 | 2/2004 |

* cited by examiner

*Primary Examiner*—David P Porta
*Assistant Examiner*—Carolyn Igyarto
(74) *Attorney, Agent, or Firm*—Fitzpatrick, Cella, Harper & Scinto

(57) ABSTRACT

At a radiation incident side of light generating means comprising light guiding means 300 including a light source such as an LED 301, a light guiding plate 303, a reflecting plate 304, a diffusing plate 305, and the like, radiation shielding members 401 to 403 for shielding the radiation are provided. As the radiation shielding members, those absorbing or reflecting 70% of the incident radiation are preferably used. Further, the radiation shielding member is disposed between a radiation detecting panel 500 and a light generating source such as the LED 301 and the like or disposed between the radiation detecting panel and a drive circuit which drives the light source such as the LED 301, and the like.

19 Claims, 10 Drawing Sheets

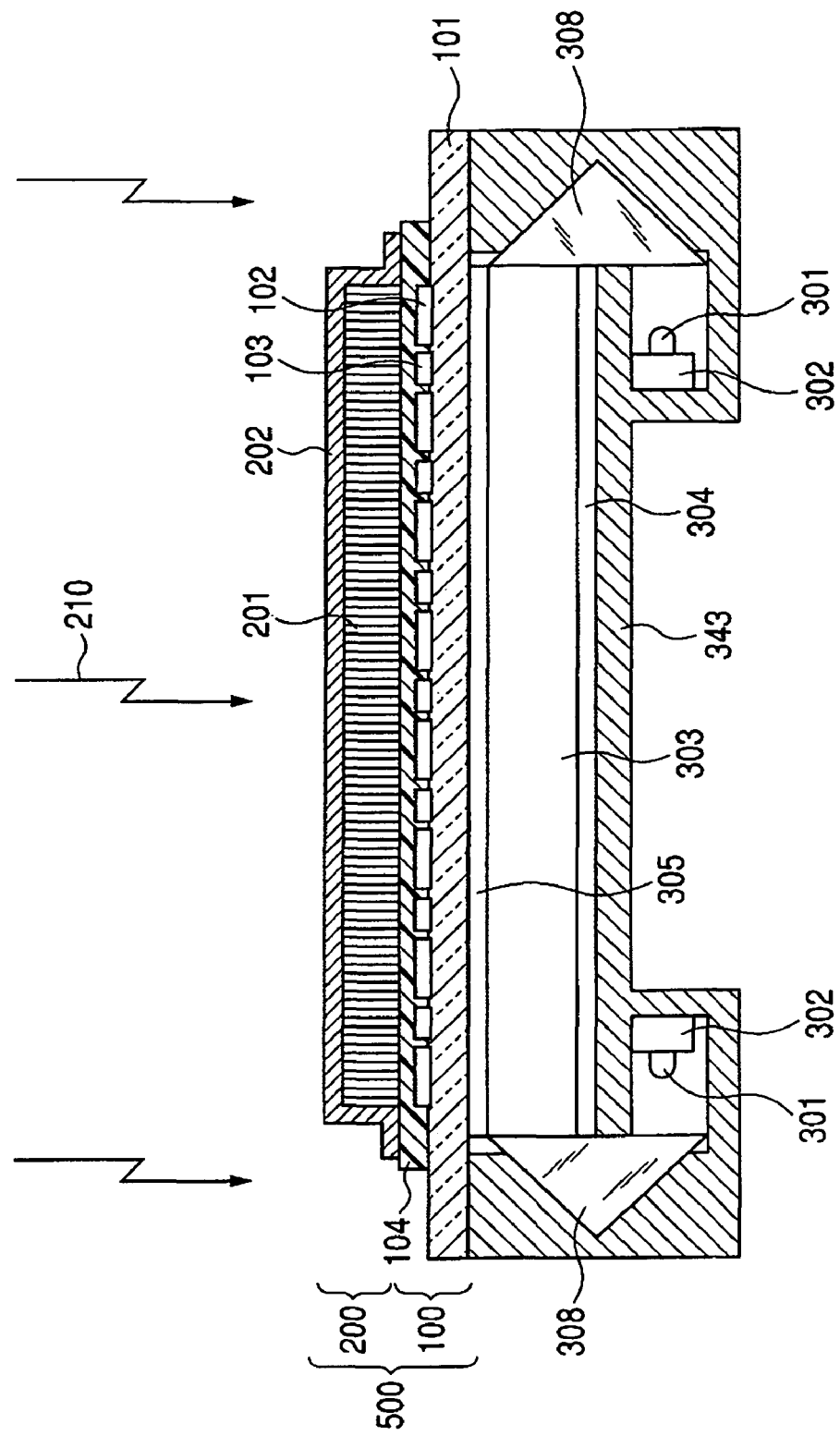

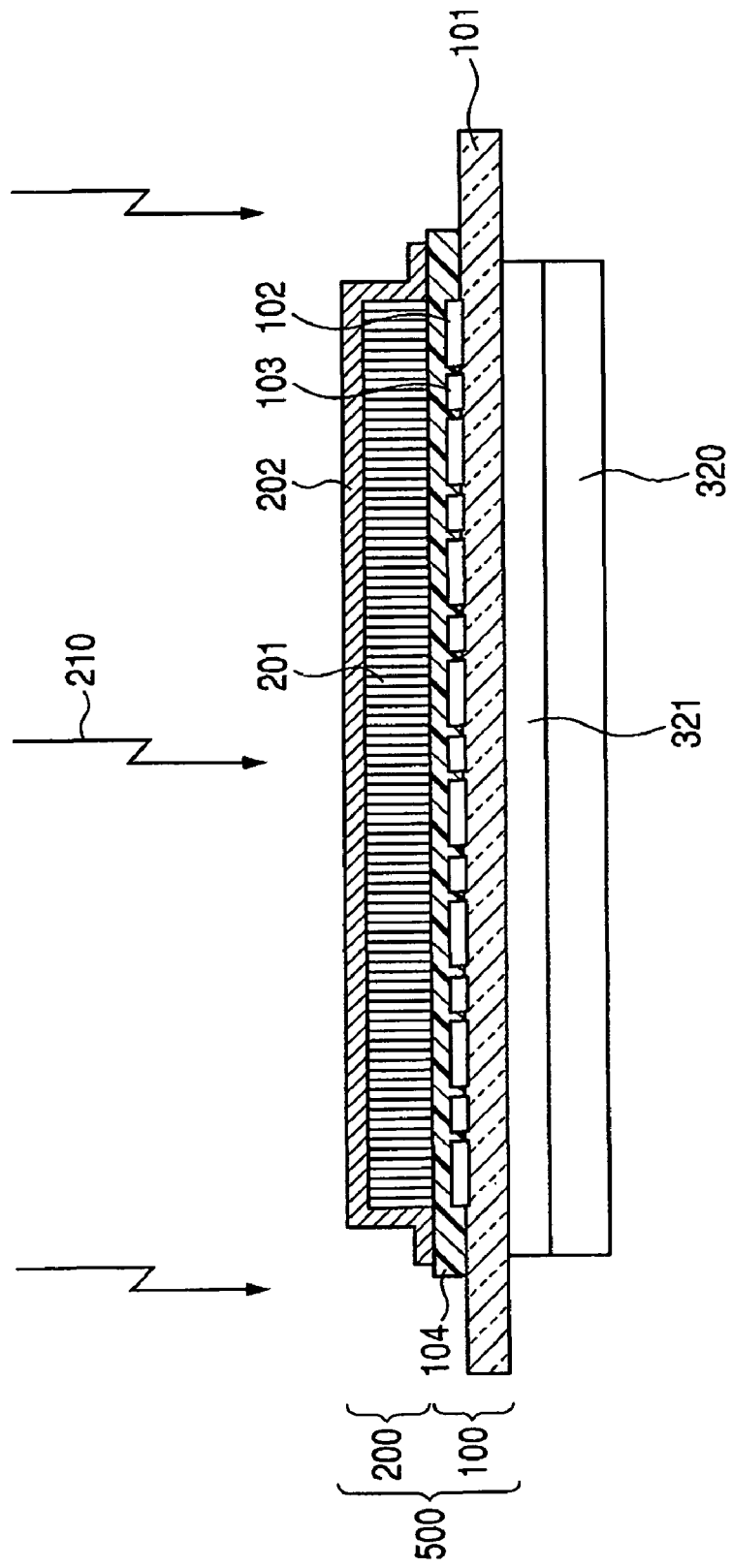

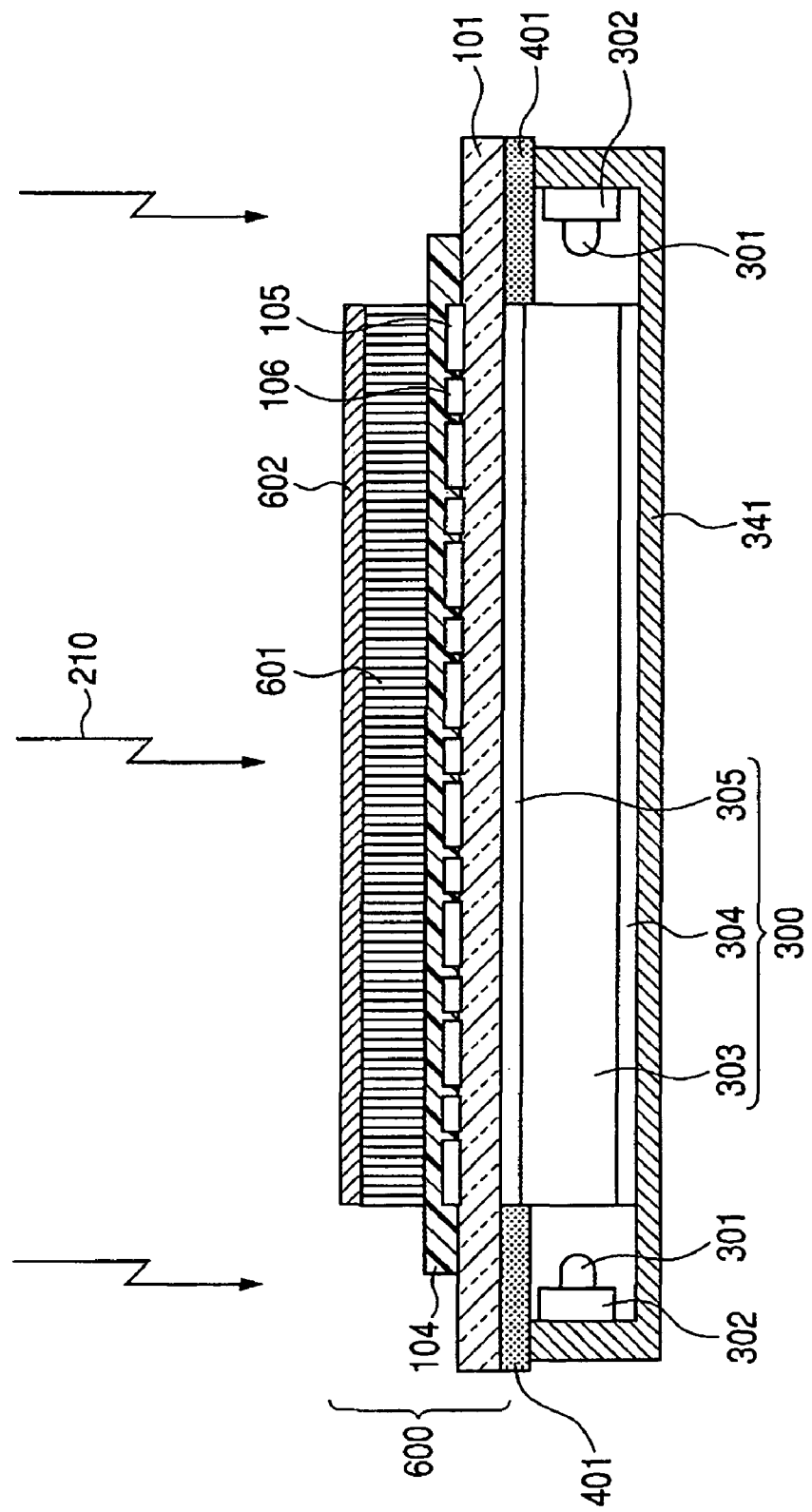

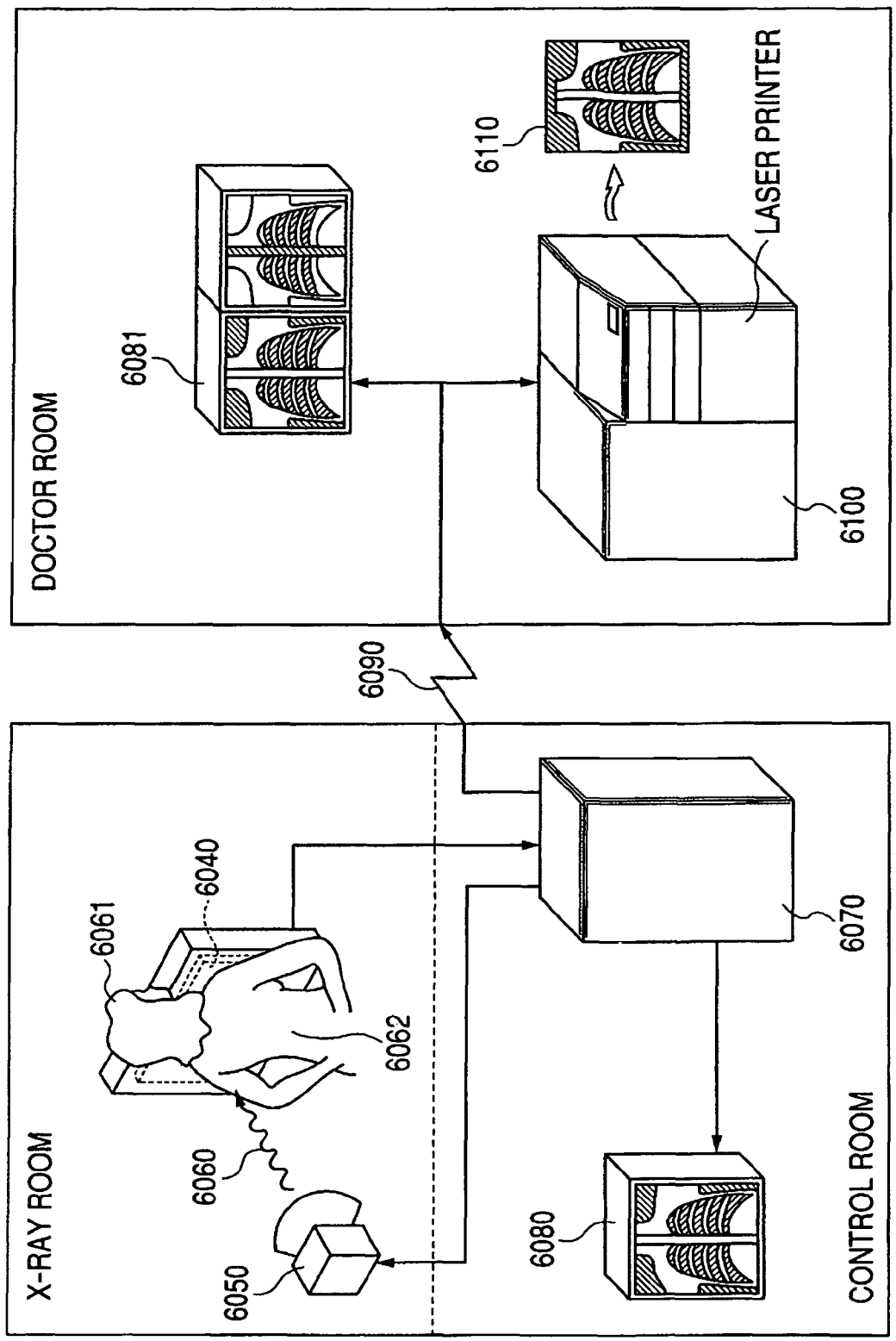

RADIATION DETECTING APPARATUS AND RADIATION IMAGING SYSTEM USING THE SAME

BACKGROUND OF THE INVENTION

1. Field of the Invention

The present invention relates to a radiation detecting apparatus used as a medial radiation diagnostic apparatus, a nondestructive inspection apparatus, and the like, and a radiation imaging system using the same.

2. Description of the Related Art

In recent years, digitalization of X-ray radiographing has been accelerating, and a variety of radiation detecting apparatuses have been proposed. Such apparatuses are mainly divided into two system types, a direct system, that is, a type of directly converting the X-rays into electrical signals and reading the same, and an indirect system, that is, a type of converting the X-rays into visible light and then converting the visible light into the electrical signals and reading the same.

Japanese Patent Application Laid-Open No. 2004-033659 discloses a radiation detecting apparatus of the direct system.

As a light source main body, a cold-cathode tube is used, or a member aligning a plurality of LEDs to allow surface-emission in a pseudo-manner is available. On the other hand, a light generator 7 was once configured separately by a light source main body and a light diffusion film, but it is now available also in an arrangement in which it is integrally configured by an EL (electroluminescence) panel and the like.

A light generator having such a configuration irradiates an almost uniform light across the entire surface of the light receiving surface of an X-ray flat panel detector. The light irradiated by the light generator is generated at an appropriate timing before and after radiographing an object, and is used for repairing sensitivity deterioration caused due to an X-ray conversion layer comprising a semiconductor layer.

Further, Japanese Patent Application Laid-Open No. 2002-040144 discloses a radiation detecting apparatus of the indirect type. This apparatus is configured by a phosphor for converting the X-rays into visible light, a photoelectric conversion panel disposed on an insulating substrate and comprising a plurality of photoelectric conversion elements detecting the visible light, a light source (LED) disposed at the backside of the insulating substrate, and light generating means comprising a light guide.

The light from light generating means is irradiated onto the photoelectric conversion element comprising a semiconductor such as amorphous silicon and the like, and is used for preventing characteristic fluctuations that may arise due to long-term use and an increase in dark current due to a trap level generated within the semiconductor film. As a light source, for example, LED, EL, semiconductor laser, cold-cathode tube, and the like are used.

Further, U.S. Patent Application Publication No. 2005/0230629 discloses a radiation detecting apparatus of the indirect system. This apparatus comprises a semiconductor layer which converts radiation information into charge information by the incidence of the radiation, an active matrix substrate laminated with this semiconductor layer on the surface and reading the charge information from this semiconductor layer, light irradiating means for irradiating a light, and sheet light guiding means disposed on the rear surface side of the active matrix substrate and receiving the light from light irradiating means from an end surface side and guiding it to the semiconductor layer through the active matrix substrate. This apparatus comprises an electromagnetic shield for shielding noises radiated from the light irradiating means between the light irradiating means and the active matrix substrate in an area where the light irradiating means is opposed to the active matrix substrate.

SUMMARY OF THE INVENTION

As the light source of such radiation detecting apparatus, particularly, when an LED comprising semiconductor materials, a semiconductor laser, and moreover, an EL (electroluminescence) device and the like are used, the light source is deteriorated from long-term use (long-term production of X-rays), and it is found that the following problems occur due to a decrease in the light amount.

(1) The trap charge of an X-ray conversion layer 25 cannot be aptly collected, thereby reducing sensitivity.

(2) The increase in dark current due to the trap level of the photoelectric conversion layer is facilitated, thereby causing a reduction in S/N.

These problems have never been recognized in the liquid crystal device using no radiation.

Further, similarly to Japanese Patent Application Laid-Open No. 2002-040144, even if a chassis, a phosphor, a protection layer, and an insulating substrate exist at the X-ray source side of the light source, it was found that absorption by these members is not sufficient, and that the light source suffers from damage by the transmitted X-rays.

This is due to the following reasons:

(1) Even if it is a phosphor, its thickness cannot be made too much in order to maintain its luminance and sharpness at a practical level, and the X-rays cannot be absorbed entirely.

(2) The insulating substrate used for a photoelectric conversion apparatus generally uses a thin glass of 0.7 mm, and therefore, amount of incident radiation that is absorbed is only approximately 10 to 30%.

(3) The chassis is configured by a material having good X-ray transmission and thickness in order to prevent desensitization.

(4) The protection layer has a mere several microns in thickness, and therefore, it transmits almost all the incident X-rays.

Furthermore, the electromagnetic shield as disclosed in U.S. Patent Application Publication No. 2005/0230629 is intended to reduce electrical influences. Consequently, since the electromagnetic shield is small in radiation-absorbing amount, the light source suffers from damage caused by the transmitted X-rays.

From the above, it is clear that the deterioration of the light source due to radiation cannot, conventionally, be helped.

An object of the present invention is to provide a radiation detecting apparatus and a radiation imaging system using the same capable of preventing the damage due to radiation, and maintaining stable performance over the long term.

To achieve the above object, the present invention is characterized by being a radiation detecting apparatus comprising a radiation detecting panel having a plurality of conversion elements, a light generator for irradiating with a light the plurality of conversion elements from a second surface side thereof opposite to a first surface thereof from which the radiation is incident, and a radiation shielding member disposed at the radiation incident side of the light generator and shielding more than or equal to 70% of the radiation.

The present invention is provided with the radiation shielding member for shielding the radiation at the radiation incident side of the light generator. As the radiation shielding member, those absorbing or reflecting the radiation are used.

By being provided with the radiation shielding member in such a manner, it is possible to inhibit the damages of the light generating means due to the radiation.

According to the present invention, since the radiation shielding member for shielding the radiation is provided at the radiation incident side of the light generating means, it is possible to prevent the damages of the light generating means due to the radiation and obtain stable radiation images over the long term.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a sectional view showing a seventh embodiment of the present invention.

FIG. 8 is a sectional view showing an eighth embodiment of the present invention.

FIG. 9 is a sectional view showing a ninth embodiment of the present invention.

FIG. 10 is a block diagram showing one embodiment of a radiation imaging system using a radiation detecting apparatus of the present invention.

DESCRIPTION OF THE EMBODIMENTS

Hereinafter, the best mode of carrying out the present invention will be described in detail with reference to the drawings. Incidentally, in the present specification, the category of "radiation" includes electromagnetic waves such as α rays, β rays, γ rays, and the like in addition to X-rays.

First Embodiment

Figure 1:
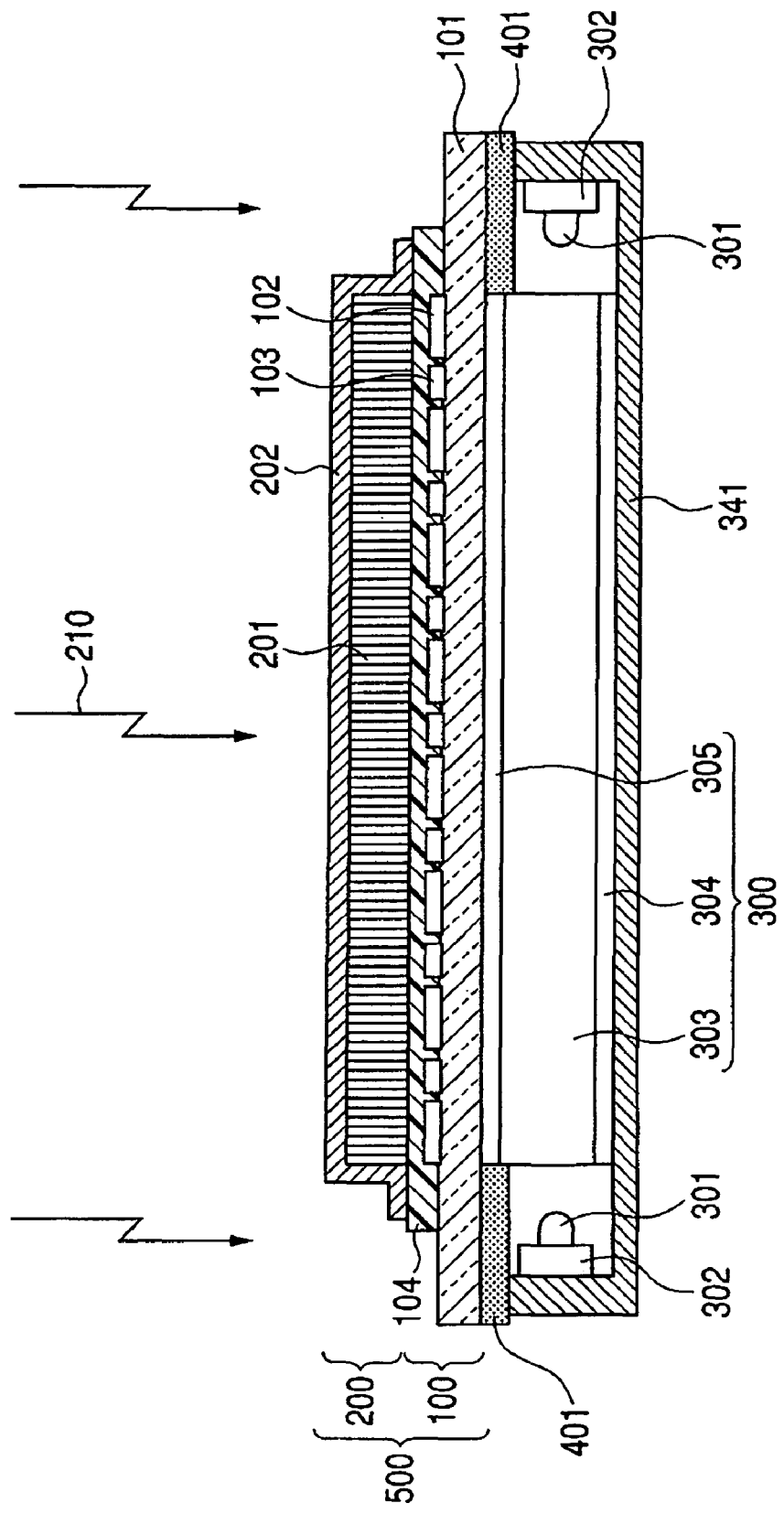
FIG. 1 is a sectional view showing a first embodiment of the present invention.

FIG. 1 is a sectional view showing a first embodiment of a radiation detecting apparatus according to the present invention. The present embodiment is of an indirect type. In the Figure, reference numeral 200 denotes a wavelength conversion portion configured by a phosphor 201 comprising CsI:TI and the like and a protection layer 202.

Further, reference numeral 100 denotes a photoelectrical conversion panel, which is configured by a plurality of photoelectrical conversion elements 102, a plurality of switch elements 103, an insulating protection layer 104, and a transparent insulating substrate 101. By this wavelength conversion portion 200 and the photoelectric conversion panel 100, an indirect type radiation detecting panel 500 is configured.

Incidentally, since the indirect type radiation detecting panel 500 is publicly known, the detailed description thereof will be omitted.

The bottom of the indirect type radiation detecting panel 500 is provided with light guiding means 300 comprising a light guiding plate 303, a reflecting plate 304, and a diffusing plate 305. At the side portion of the light guiding means 300, an LED 301 is disposed, and the light guiding means 300 guides a light from the LED 301 to the entirety of the surface, and uniformly guides the light to the upper photoelectric conversion element 102 or switch element 103 or phosphor 201. Since the light guiding means 300 is publicly known as a transmission type liquid crystal back light, the detailed description thereof will be omitted.

The LED 301 is plurally disposed in a transverse direction (front and back directions in the Figure) on an electrical mounting substrate 302. All these members are supported by a chassis 341, and between the LED 301 and the transparent insulating substrate 101, a shielding plate 401 according to the present invention is disposed.

The shielding plate 401, for example, is made from a stainless or molybdenum plate and the like, and absorbs radiation 210 from an upper radiation source (not shown), and reduces the radiation 210 incident in the direction of the LED 301, thereby inhibiting damage to the LED due to the radiation. Further, though not shown in FIG. 1, the shielding plate 401 may at least shield the LED 301 from the radiation or may be provided by being divided so that each of several pieces shields one LED 301 only or may be made of one piece so as to collectively shield a plurality of LEDs 301. In the present embodiment, while the LED is cited as an example as a light source, the use of the EL, semiconductor laser, cold-cathode tube and the like in addition to the LED does not deviate from the scope of the present invention. It holds true also for the following embodiments.

In the present embodiment, the radiation is thus shielded by the shielding plate 401, so that the light source can be shielded from the radiation with ease, and it is possible to inhibit radiation damages of the LED due to the irradiation with radiation.

Incidentally, if a drive circuit (not shown) which drives the LED 301 is mounted on the electrical mounting substrate 302, radiation damaging of the drive circuit also can be inhibited Further, it is desirable to inhibit radiation damage by using the same shielding plate when the drive circuit is mounted on an unillustrated printed circuit board together with an unillustrated sensor drive circuit and the like through TCP and the like.

Second Embodiment

Figure 2:
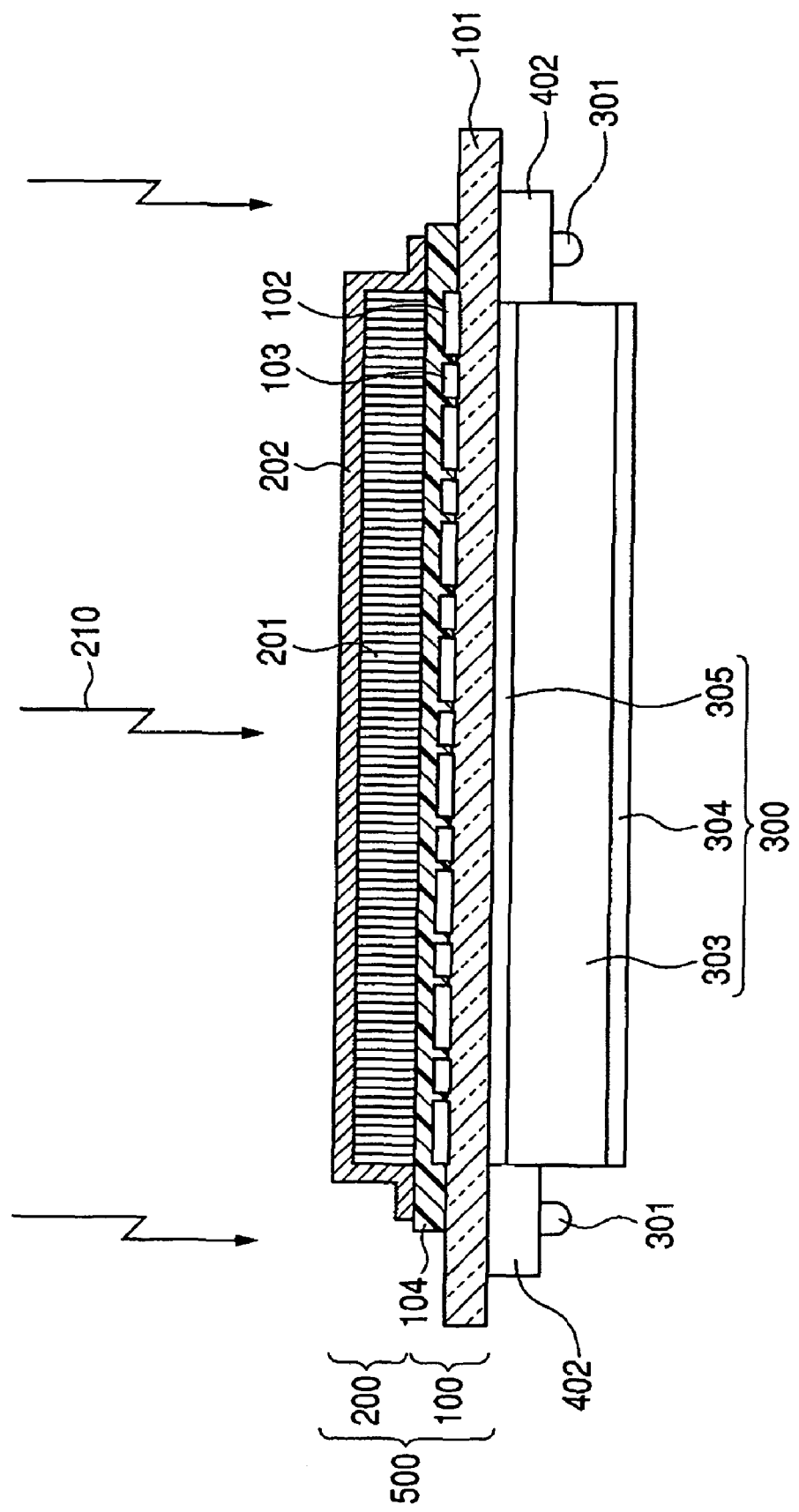
FIG. 2 is a sectional view showing a second embodiment of the present invention.

FIG. 2 is a sectional view showing a second embodiment of the present invention. In FIG. 2, the same reference numerals are attached to the same parts as FIG. 1. The present embodiment is also of an indirect type.

In the present embodiment, similarly to FIG. 1, by light guiding means 300 comprising a light guiding plate 303, a reflecting plate 304, and a diffusing plate 305, light of an array of LEDs 301 disposed at its side portion is guided to the entirety of an photoelectric conversion element 102 or a switch element 103 or a phosphor 201 of a radiation detecting panel 500. The LEDs 301, similarly to FIG. 1, are plurally disposed in a transverse direction (front and back directions in the Figure).

A shielding electrical mounting substrate 402 mounting the LED 301 is attached to an upper transparent insulating substrate 101. The shielding electrical mounting substrate 402, for example, is made from a stainless or molybdenum plate, and the like, and absorbs a radiation 210 from the upper part, and reduces the radiation 210 incident in the direction of the LED 301, thereby inhibiting radiation damages of the LED 301. Further, though not shown in FIG. 2, the shielding electrical mounting substrate 402 is a substrate in which wirings are formed on a metal base plate through an insulating portion.

Even if the structure of the present embodiment is other than the above described, if it can realize the electrical mounting function and the radiation shielding function, it is not limited to the structure of the present embodiment. With such a structure set up, in addition to the effect of FIG. 1, the number of parts is further reduced, and the structure thereof can be made simple.

Incidentally, if the drive circuit (not shown) which drives the LED 301 is mounted on the shielding electrical mounting substrate 402, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Third Embodiment

Figure 3:
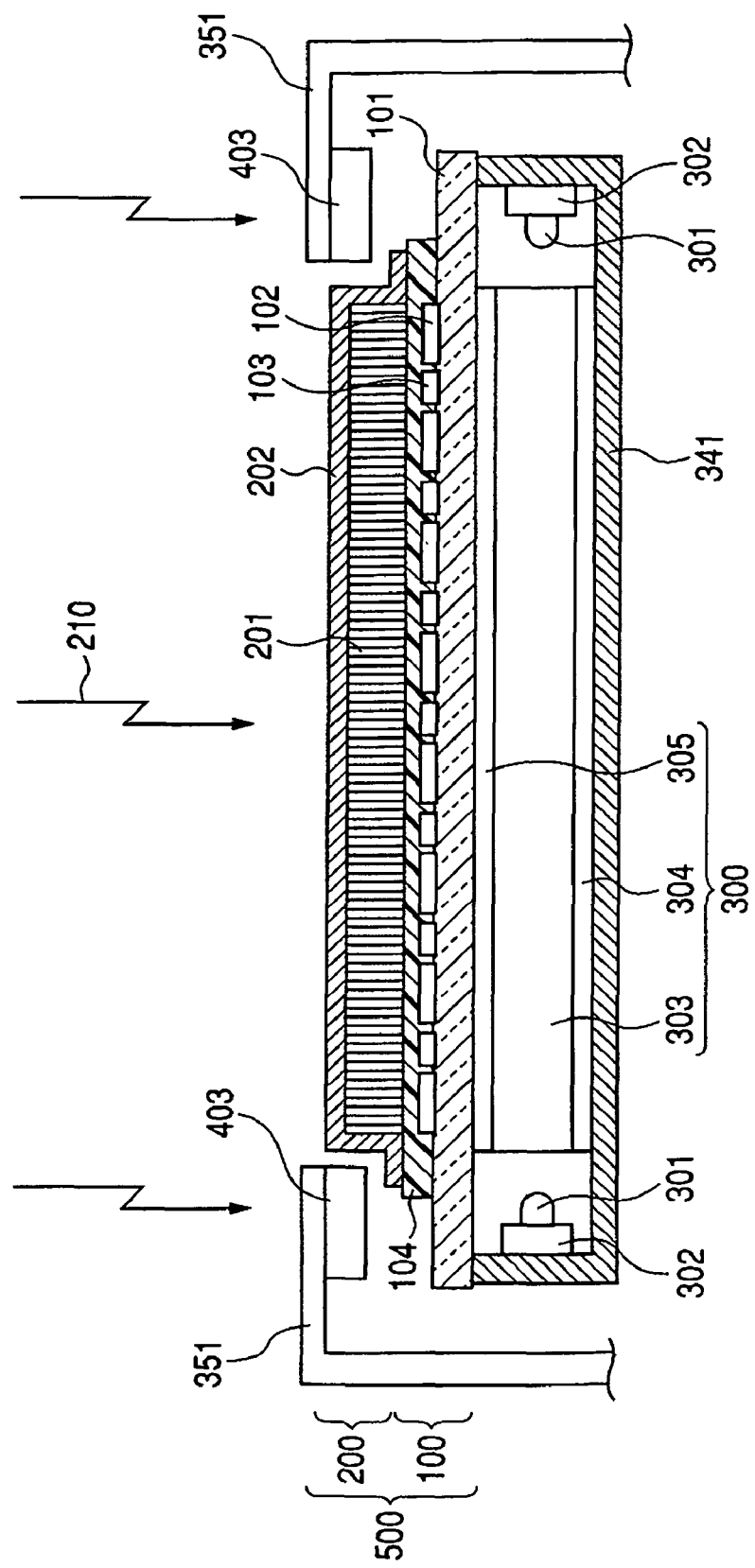
FIG. 3 is a sectional view showing a third embodiment of the present invention.

FIG. 3 is a sectional view showing a third embodiment of the present invention. The present embodiment also is of an indirect type. In FIG. 3, the same parts as those of FIGS. 1 and 2 are attached with the same reference numerals. A shielding plate 403 is installed at a part of a cover 351 covering the periphery of a radiation detecting apparatus. The shielding plate 403, similarly to FIG. 1, is made from a stainless or molybdenum plate and the like, and absorbs a radiation 210 from the upper radiation source, and reduces the radiation 210 incident in the direction of an LED, thereby inhibiting radiation damages of the LED.

In the present embodiment, though a structure of attaching the shielding plate 403 on the cover 351 is shown in a representative manner, even if the shielding plate 403 is attached to a grid or a protection plate and the like provided that it is an exterior part of the radiation detecting apparatus, this does not deviate from the scope of the present invention. With such a structure set up, in addition to the advantageous effect of FIG. 1, the assembly thereof can be made much simpler.

Incidentally, if the drive circuit (not shown) which drives the LED 301 is mounted on an electrical mounting substrate 302, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Fourth Embodiment

Figure 4:
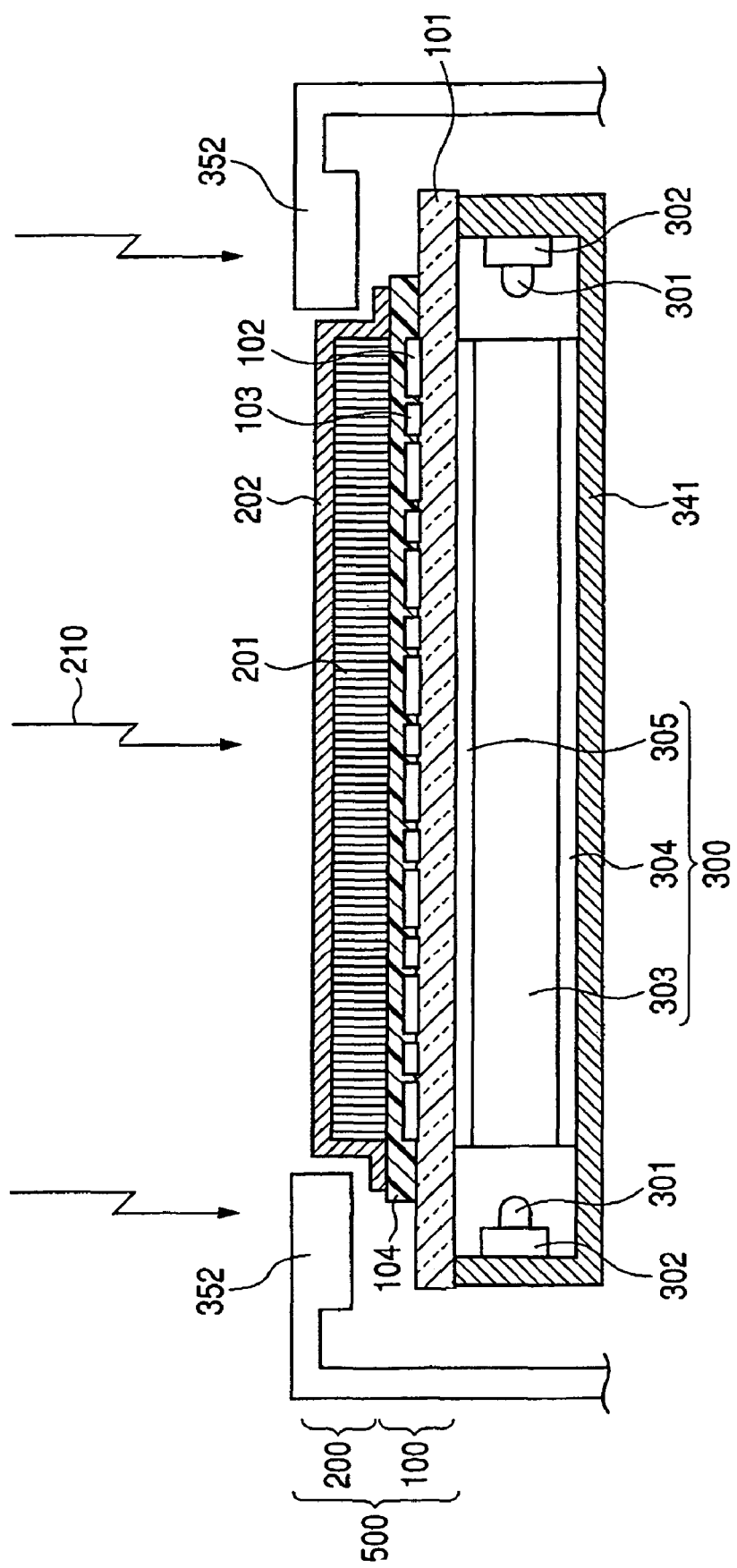
FIG. 4 is a sectional view showing a fourth embodiment of the present invention.

FIG. 4 is a sectional view showing a fourth embodiment of the present invention. The present embodiment also is of an indirect type. In FIG. 4, the same portions as FIGS. 1, 2 and 3 are attached with the same reference numerals.

In the present embodiment, a part of the shielding cover 352 for covering the periphery of a radiation detecting apparatus is made thick, so that a radiation shielding effect is given. The shielding cover 352, for example, is made from a metal of stainless or molybdenum and the like, and a thick portion of the shielding cover 352 reduces a radiation 210 incident in the direction of an LED, thereby inhibiting radiation damages of the LED.

In the present embodiment, a part of the structure of the cover 352 is changed, so that an example of shielding the radiation is shown representatively. However, even if the structure of a grid, protection plate, and the like is changed so as to realize the shielding of the radiation provided that it is an exterior part of the radiation detecting apparatus, this does not deviate from the scope of the present invention. With such a structure set up, the assembly thereof can be made much simpler, and in addition to this, the structure becomes much simpler.

Incidentally, if the drive circuit (not shown) that drives the LED 301 is mounted on the electrical mounting substrate 302, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Fifth Embodiment

Figure 5:
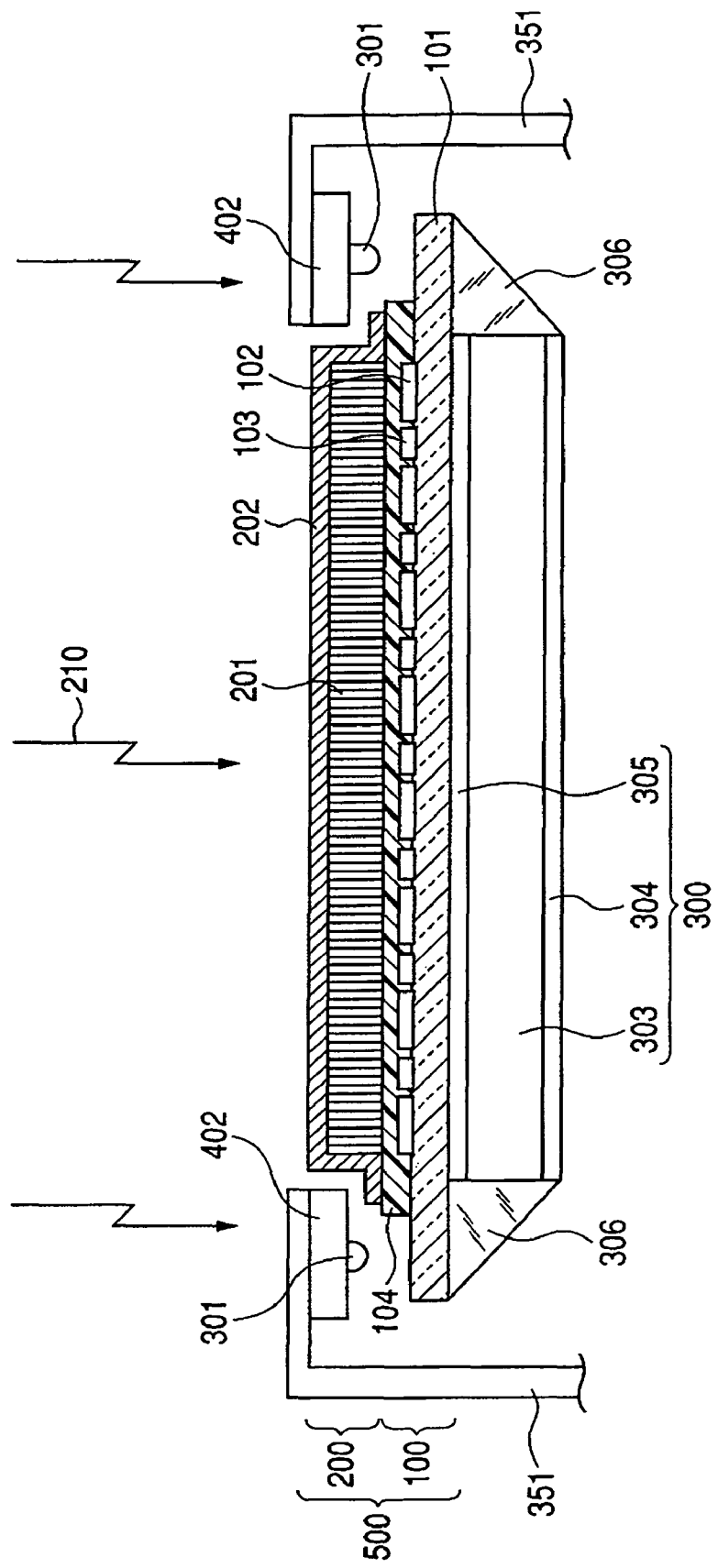
FIG. 5 is a sectional view showing a fifth embodiment of the present invention.

FIG. 5 is a sectional view showing a fifth embodiment of the present invention.

The present embodiment also is of an indirect type. In FIG. 5, the same reference numerals are attached to the same parts as those of FIGS. 1, 2, 3, and 4.

In the present embodiment, an LED 301 and an electrical mounting substrate 402 are fixed to the bottom of a cover 351 of the upper part of a transparent insulating substrate 101. The electrical mounting substrate 402 is the same as that of FIG. 2, and is made from a stainless or molybdenum plate and the like, and absorbs a radiation 201 from the upper part, and reduces the radiation 210 incident in the direction of an LED, thereby inhibiting the radiation damages of the LED.

The light emitted from the LED 301 transmits the transparent insulating substrate 101, and is bent 90° by a prism mirror 306 disposed at the bottom, and is guided to a light guiding plate 303. In the present embodiment, though a structure of attaching the electrical mounting substrate 402 with the LED to the cover 351 is shown in a representative manner, even if it is attached to a grid or a protection plate, and the like provided that it is an exterior part of the radiation detecting apparatus, this does not deviate from the scope of the present invention. With such a structure set up, the maintenance property of the light source is improved.

Incidentally, if the drive circuit (not shown) that drives the LED 301 is mounted on the electrical mounting substrate 402, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Sixth Embodiment

Figure 6:
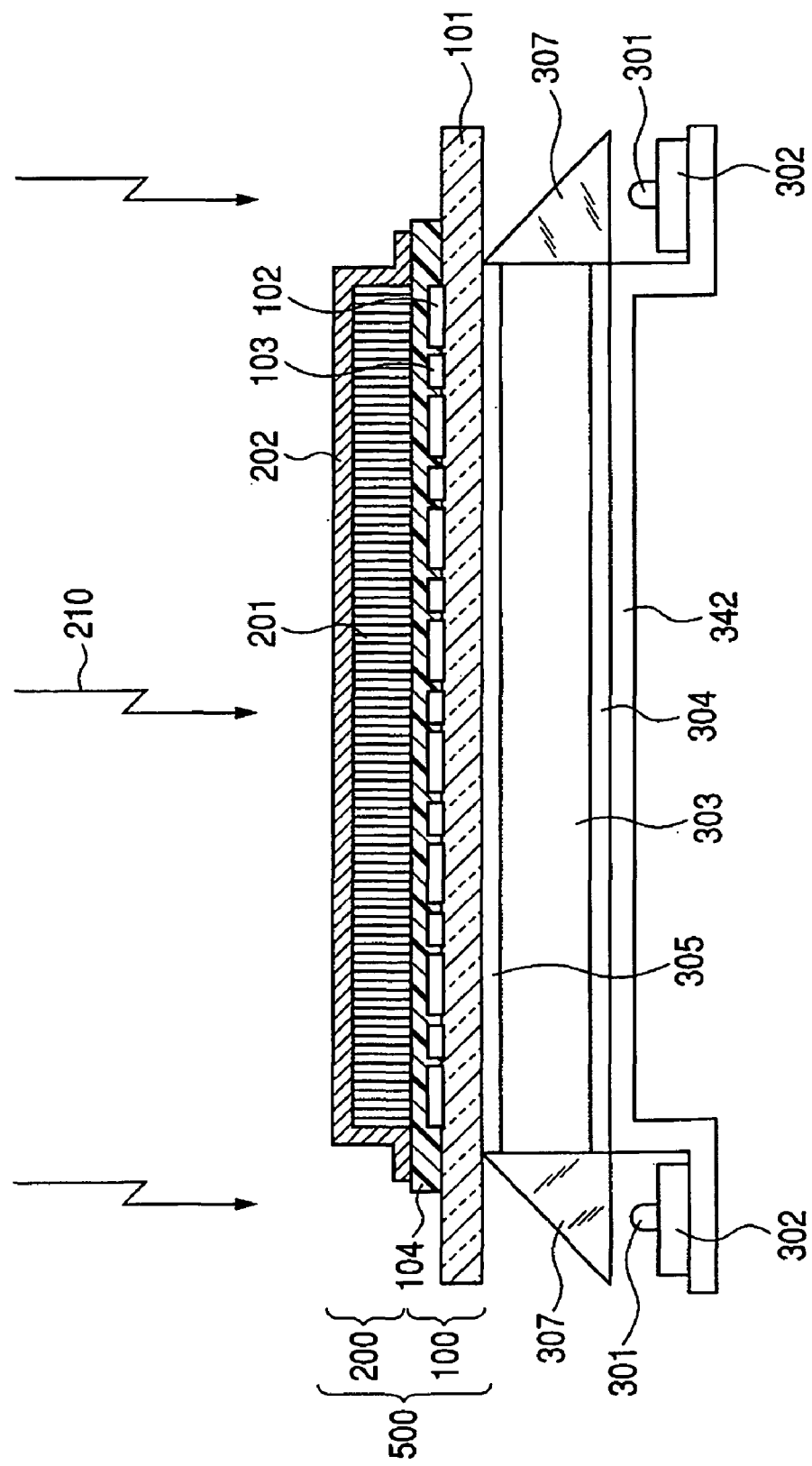
FIG. 6 is a sectional view showing a sixth embodiment of the present invention.

FIG. 6 is a sectional view of a six embodiment of the present invention. The present embodiment is also of an indirect type. In FIG. 6, the same reference numerals are attached to the same parts as those of FIGS. 1, 2, 3, 4 and 5.

In the present embodiment, an LED 301 and an electrical mounting substrate 302 mounting it are installed at a chassis 342 of the bottom of a shielding prism mirror 307, and the light emitted from the LED 301 is bent 90° by the shielding prism minor 307, and enters a light guiding plate 303.

The shielding prism 307 reduces a radiation 210 incident in the direction of the LED, and inhibits radiation damages of the LED. With such a structure set up, heat of the LED 301 can be allowed to efficiently escape to a chassis 342.

Incidentally, if the drive circuit (not shown) that drives the LED 301 is mounted on the electrical mounting substrate 302, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Seventh Embodiment

FIG. 7 is a sectional view of a seventh embodiment of the present invention.

The present embodiment is also of an indirect type. In FIG. 7, the same reference numerals are attached to the same parts as those of FIGS. 1, 2, 3, 4, 5 and 6. The present embodiment further develops FIG. 6, and an LED 301 and an electrical mounting substrate 302 mounting it are installed within a shielding chassis 343. The shielding chassis 343, for example, is made from a metal plate such as stainless or molybdenum and the like, and absorbs a radiation 210 from the upper part, and inhibits the damages of the LED 301 due to the radiation.

The light emitted from the LED 301 repeats a total reflection two times by a prism mirror 308, and is bent 180°, and is guided to a light guiding plate 303. With such a structure set up, it is possible to allow the chassis 343 to function not only as a radiation shielding member, but also as a noise shielding plate of shielding electrical noises from the light source for the photoelectric conversion panel.

Incidentally, if the drive circuit (not shown) that drives the LED 301 is mounted on the electrical mounting substrate 302, radiation damaging of the drive circuit also can be inhibited. Further, it is desirable to inhibit the radiation damages by using the same shielding plate when the drive circuit is mounted on an unillustrated printed circuit board together with an unillustrated sensor drive circuit and the like through TCP and the like.

Eighth Embodiment

FIG. 8 is a sectional view of an eighth embodiment of the present invention. The present embodiment is also of an indirect type. In FIG. 8, the same reference numerals are attached to the same parts as those of FIGS. 1, 2, 3, 4, 5, 6 and 7.

The present embodiment disposes a surface emission element 320 such as an EL and the like at the bottom of a photoelectric conversion panel 100, and between both of them, there is installed a transparent shielding plate 321 formed from a material being transparent and having good radiation absorption characteristics such as lead glass. The transparent shielding plate 321 reduces a radiation 210 incident in the direction of an EL, thereby inhibiting the radiation damages of the EL. With such a structure set up, it is possible to set up a simple structure having the small number of parts.

Further, when the EL is driven, an inverter drive circuit is required, but if an inverter is built into the EL, and together with the EL, it is mounted as the surface emission element 320, radiation damaging of the drive circuit also can be inhibited by the transparent shielding plate 321. Further, as described above, it is desirable to inhibit the radiation damages by using the same shielding plate when the drive circuit is mounted on an unillustrated printed circuit board together with an unillustrated sensor drive circuit and the like through TCP and the like.

Further, when the printed circuit board is disposed at the back surface side (the bottom of surface emission element 320 of FIG. 8) of the sensor panel, the radiation damages of the drive circuit can be inhibited by the transparent shielding plate 321.

Ninth Embodiment

FIG. 9 is a sectional view of a ninth embodiment of the present invention. The present embodiment is of a direct type. In FIG. 9, the same reference numerals are attached to the same parts as those of FIG. 1.

In the Figure, reference numeral 600 denotes a direct type radiation detecting panel, and is configured by a direct conversion type semiconductor layer 601 comprising a-Se and the like for directly converting a radiation into an electrical signal, a common electrode 602, a plurality of capacitor elements 105, a plurality of switch elements 106, and a transparent insulating substrate 101.

Since the direct type radiation detecting panel 600 is publicly known, the detailed description thereof will be omitted. Further, since the unit at the bottom of the direct type radiation detecting panel 600 has the same structure as FIG. 1, the description thereof will be omitted. The light from a light guiding plate 303 transmits the transparent insulating substrate 101, and is guided to a semiconductor layer 601 or capacitor element 105 or switch element 106.

The shielding plate 401 is made from a metal plate of molybdenum, stainless, and the like, and as described above, absorbs a radiation 210, and reduces the radiation incident in the direction of an LED, thereby inhibiting the damages of the LED.

With such a structure set up, even if it is of a direct type, the damages of the light source and the like due to the radiation can be prevented. Incidentally, though only natural, it is clear that the configurations of the second to eighth embodiments are adaptable to the direct type radiation detecting apparatus.

Further, if the drive circuit (not shown) that drives the LED 301 is mounted on the electrical mounting substrate 302, radiation damage to the drive circuit also can be inhibited. Further, it is desirable to inhibit the radiation damage by using the same shielding plate when the drive circuit is mounted on an unillustrated printed circuit board together with an unillustrated sensor drive circuit and the like through TCP and the like.

Tenth Embodiment

FIG. 10 is a block diagram showing one embodiment of a radiation imaging system using a radiation detecting apparatus of the present invention. X-rays 6060 generated by an X-ray tube 6050 are transmitted through a chest portion 6062 of an patient or a test subject 6061, and enter the radiation detecting apparatus (image sensor) 6040 according to the present invention. The incident X-rays contain information on the interior of the body of the patient or a test subject 6061.

In response to the incidence of the X-raya, the phosphor layer emits light, and this light is photoelectrically converted by the photoelectric conversion element of a sensor panel, so that electric information is obtained. This information is converted into digital information, and this is subjected to image processing by an image processor 6070 being signal processing means, and then, this can be observed by a display 6080 that serves as display means installed in a control room.

Further, this information can be transferred to a remote location by transfer processing means such as a telephone circuit 6090 and the like, and can be displayed on a display 6081 installed in a doctor's office or the like at a separate location. Further, the information can be stored in storage means such as an optical disk and the like, thereby allowing a doctor at a remote location to make a diagnosis. Further, the information can be recorded in a film 6110 by a film processor 6100 serving as recording means.

Here, in the above described embodiments, the radiation shielding members such as the shielding plate 401, the shielding electrical mounting substrate 402 or the shielding plate 403, the transparent shielding plate 321 and the like inhibit penetration of the radiation into the materials which substantially configure light generating means such as the LED 301, the light emitting surface element 320, and the like. As a result, damage to those component materials from the radiation can be inhibited. Such damage to the component materials of the light emitting means includes changes that cause the deterioration of the functions of the light generating means such as the deterioration of the semiconductor characteristics due to the damages of crystal or the deterioration of optical characteristics due to the generation of color, and the like. The effect due to the radiation shielding member may even be so great that the influence of the damages does not deviate from the specifications of the apparatus in the service life of the apparatus, though there is no need to inhibit the radiation 100%. That is, the influence of the damages may be to such an extent that it does not appear as a malfunction of the radiation detection performance as a result. The radiation inhibiting effect of the radiation shielding member is preferably more than or equal to 70%. Further, as shown in FIGS. 1, 2, 3, 4, 5, 6, 7 and 8, when there exists a wavelength conversion substance or a direct conversion type semiconductor between the radiation shielding member and the radiation source, the radiation inhibiting effect of the radiation shielding member may be preferably more than or equal to 10%.

The radiation shielding member such as the shielding plate 401, the shielding electrical mounting substrate 402, and the like is disposed between the radiation source and the light generating means such as the LED 301 or the surface emission element 320 so as not to shield a radiation receiving surface of the radiation detecting apparatus.

The radiation shielding member may be those absorbing or reflecting the radiation to keep the above described effect. The material of the radiation shielding member is not particularly limited. Whichever type of absorption or reflection it is, it may be used if properly designed.

The material of the radiation shielding member is desirable to preferably use a material in which the atomic number is larger and the specific weight is larger if it absorbs the radiation, that is, a material larger in radiation absorption coefficient. This can make the whole thickness thin. Preferably, metal, metal compound, and the like are better.

Incidentally, the material of the radiation shielding member, if intended to reflect the radiation, may be better configured by a material larger in scattering coefficient.

Further, the radiation shielding member may be much better if configured together with other functions. By so doing, the number of parts is reduced, the design is made compact, and cost cutting is made possible. For example, the substrate mounting a light emission diode may serve also as the shielding member. In this case, the substrate may be metal.

Further, as shown in FIG. 6, the optical parts may be used as the shielding means. As the optical parts, a prism mirror, a lead glass, an optical filter, and the like can be cited.

Further, the radiation shielding member, for example, may serve as a chassis, a cover, a grid, and the like which are the exterior parts of the radiation detection apparatus. The exterior parts are not limited to these parts. As the light generating means, as described above, the LED, the semiconductor laser, the EL, the cold-cathode tube, and the like are used, and the emitted light enters a specific part of the radiation detecting apparatus. At this time, the light generating means is not limited to these means so long as the means adopted produce light of a wavelength which realizes the target effect. The preferable wavelength of the light generating means is in the ultraviolet, visible or infrared portion of the spectrum.

When the photoelectric conversion element or the switch element is irradiated from the light generating means, the semiconductor material thereof is irradiated so that some actions are allowed to occur. For example, there are discharge of carriers and the like caught by a trap level.

When a wavelength converter is irradiated from the light generating means, its light irradiating material is irradiated, so that some actions are allowed to occur. For example, there are tone reduction and the like of the wavelength converter which color-forms by the irradiation of the radiation.

Further, when the semiconductor element converting the radiation into a direct charge from the light generating means is irradiated, its semiconductor material is irradiated, so that some actions are allowed to occur. For example, there are repair and the like of polarized effect.

Further, the wavelength converter corresponds to all the phosphors which generate the magnetic wave different from the wavelength of the radiation by the incidence of the radiation. For example, an phosphor of an oxide system doping the metal such as Gd2O2S:Tb, La2O2S:Tb, Y2O2S:Tb, and the like, and an phosphor of a halogenation alkali system doping the metal such as CsI:Tl, CsI:Na, and the like are available.

The semiconductor element converting the radiation into direct charge corresponds to all the semiconductors that directly generate the electric charge by the incidence of the radiation. For example, an amorphous substance such as Se, Se compounds and the like, and an amorphous substance such as Se and Se compounds and the like doping alkali metal or halogen, and an amorphous substance such as Se and Se compounds corresponding to those compounds can be cited. Further, polycrystalline substances and the like comprising a compound semiconductor such as CdTe, CdZnTe, PbI2, HgI2, TlBr, GaAs, and the like are available.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-354888, filed Dec. 8, 2005, which is hereby incorporated by reference herein in its entirety.

What is claimed is:

1. A radiation detecting apparatus, comprising:
a radiation detecting panel having a first surface, a second surface opposite to said first surface, and a plurality of conversion elements arranged in a first region in said first surface;
light generating means, for irradiating said plurality of conversion elements with light, arranged over a radiation-incident side of said radiation detecting panel in a second region;
wherein said radiation-incident side is the same side as said first surface and said second region being outside said first region;
a cover covering over said first surface of said radiation detecting panel in said second region, said cover comprising said light generating means;

a radiation shielding member arranged at said radiation-incident side of said light generating means to shield out at least 70% of incident radiation; and a light guiding means arranged in the second surface for guiding a light from said light generating means toward said plurality of conversion elements.

2. The radiation detecting apparatus according to claim 1, wherein said light generating means comprises a plurality of light sources and a drive circuit for driving said plurality of light sources.

3. The radiation detecting apparatus according to claim 1, wherein said radiation shielding member serves as a component part of said light generating means.

4. The radiation detecting apparatus according to claim 1, wherein said cover is a part of an exterior part of the radiation detecting apparatus, and said radiation shielding member serves also as said cover.

5. The radiation detecting apparatus according to claim 1, wherein said cover is a part of an exterior part of the radiation detecting apparatus, and said radiation shielding member serves also as said cover, and wherein the exterior part has a chassis for supporting said radiation detecting panel.

6. The radiation detecting apparatus according to claim 1, wherein a wavelength converter is provided on the first surface of said radiation detecting panel.

7. The radiation detecting apparatus according to claim 1, wherein a wavelength converter is provided on the first surface of said radiation detecting panel, and wherein said wavelength converter is a phosphor.

8. The radiation detecting apparatus according to claim 1, wherein the radiation detecting panel has a switch connected to the conversion elements.

9. A radiation imaging system, comprising:
the radiation detecting apparatus according to claim 1;
signal processing means for processing a signal from said radiation detecting apparatus;
recording means for recording a signal from said signal processing means;
display means for displaying a signal from said signal processing means;
transfer processing means for transferring a signal from said signal processing means; and
a radiation source for generating the radiation.

10. A radiation detecting apparatus, comprising:
a radiation detecting panel having a first surface, a second surface opposite to said first surface, and a plurality of conversion elements arranged in a first region in said first surface;
light generating means, for irradiating said plurality of conversion elements with light, arranged over a radiation-incident side of said radiation detecting panel in a second region
wherein said radiation-incident side is the same side as said first surface and said second region being outside said first region;

a cover covering over said first surface of said radiation detecting panel in said second region, said cover comprising said light generating means;

a radiation shielding member arranged at said radiation-incident side of said light generating means to shield out at least 70% of incident radiation; and an optical part arranged in the second surface side for guiding a light from said light generating means toward said plurality of conversion elements, in opposition to said light generating means.

11. The radiation detecting apparatus according to claim 10, wherein said optical part is a prism minor for reflecting a light from said light generating means.

12. The radiation detecting apparatus according to claim 10, wherein said light generating means comprises a plurality of light sources and a drive circuit for driving said plurality of light sources.

13. The radiation detecting apparatus according to claim 10, wherein said radiation shielding member serves as a component part of said light generating means.

14. The radiation detecting apparatus according to claim 10, wherein said cover is a part of an exterior part of the radiation detecting apparatus, and said radiation shielding member serves also as said cover.

15. The radiation detecting apparatus according to claim 10, wherein said cover is a part of an exterior part of the radiation detecting apparatus, and said radiation shielding member serves also as said cover, and wherein the exterior part has a chassis for supporting said radiation detecting panel.

16. The radiation detecting apparatus according to claim 10, wherein a wavelength converter is provided on the first surface of said radiation detecting panel.

17. The radiation detecting apparatus according to claim 10, wherein a wavelength converter is provided on the first surface of said radiation detecting panel, and wherein said wavelength converter is a phosphor.

18. The radiation detecting apparatus according to claim 10, wherein the radiation detecting panel has a switch connected to the conversion elements.

19. A radiation imaging system, comprising:
the radiation detecting apparatus according to claim 10;
signal processing means for processing a signal from said radiation detecting apparatus;
recording means for recording a signal from said signal processing means;
display means for displaying a signal from said signal processing means;
transfer processing means for transferring a signal from said signal processing means; and
a radiation source for generating the radiation.

* * * * *